June 24, 1924.
W. H. RICHEY
SAW RIG FOR FORDSON TRACTORS
Filed May 31, 1922    3 Sheets-Sheet 3
1,499,031
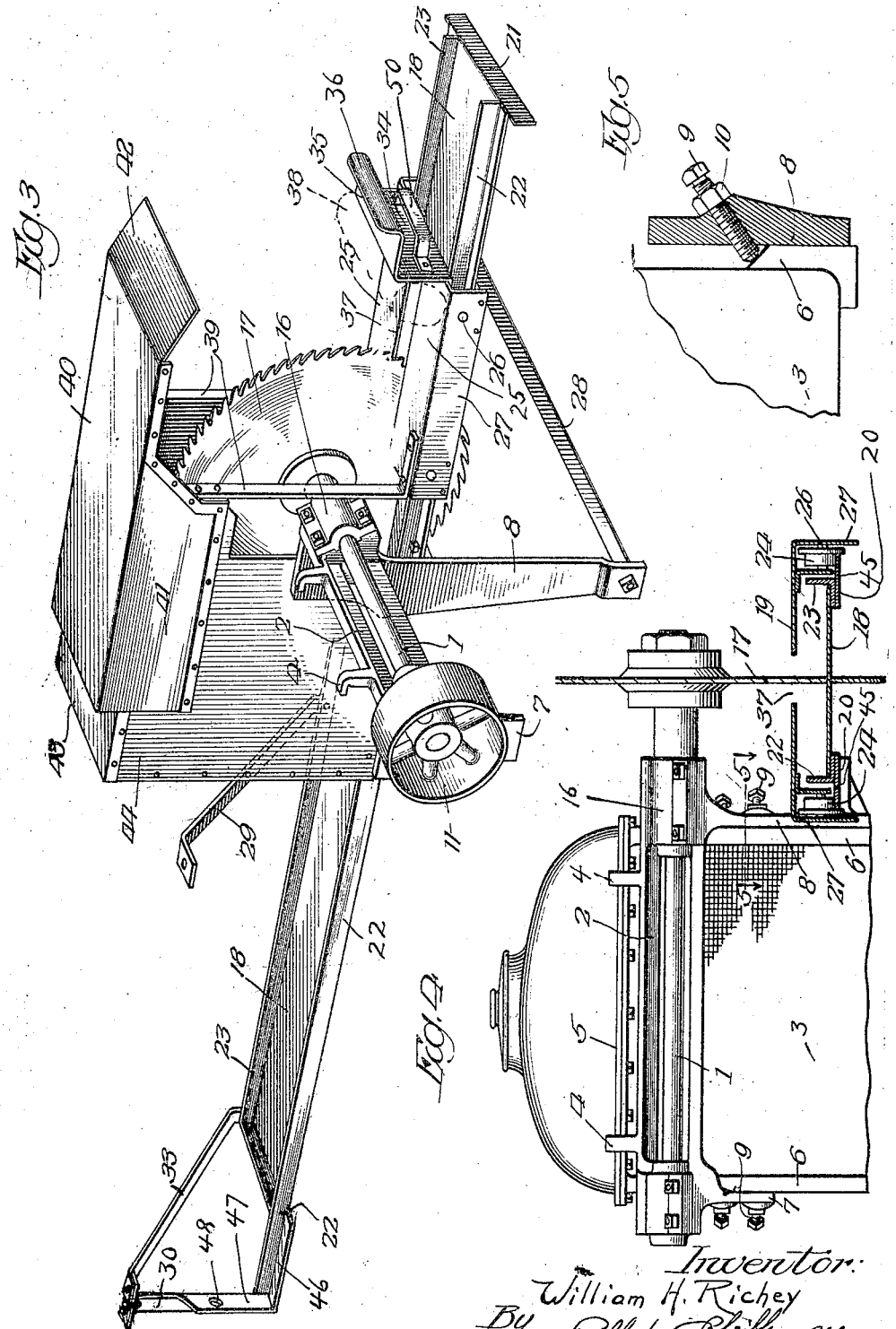

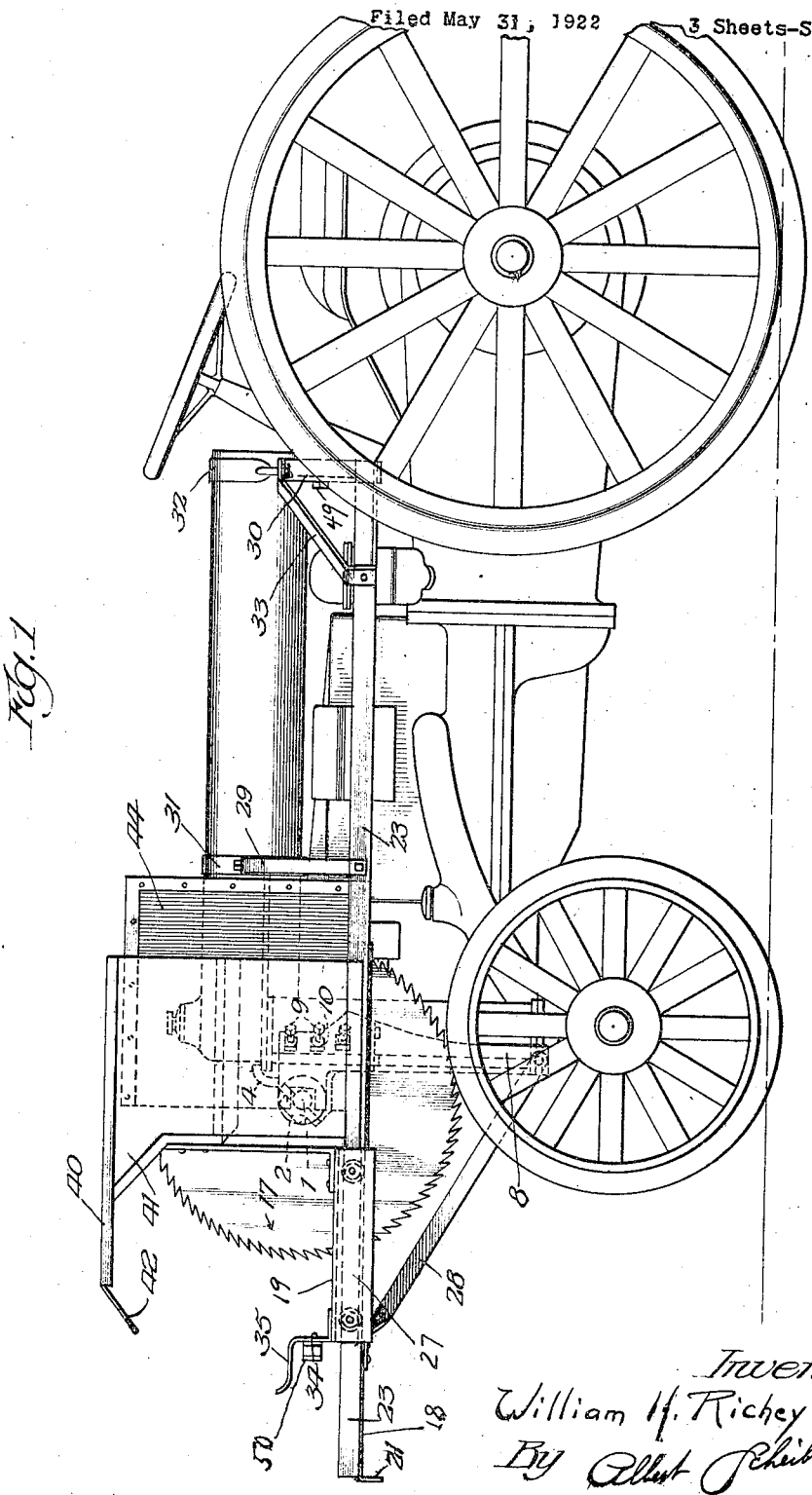

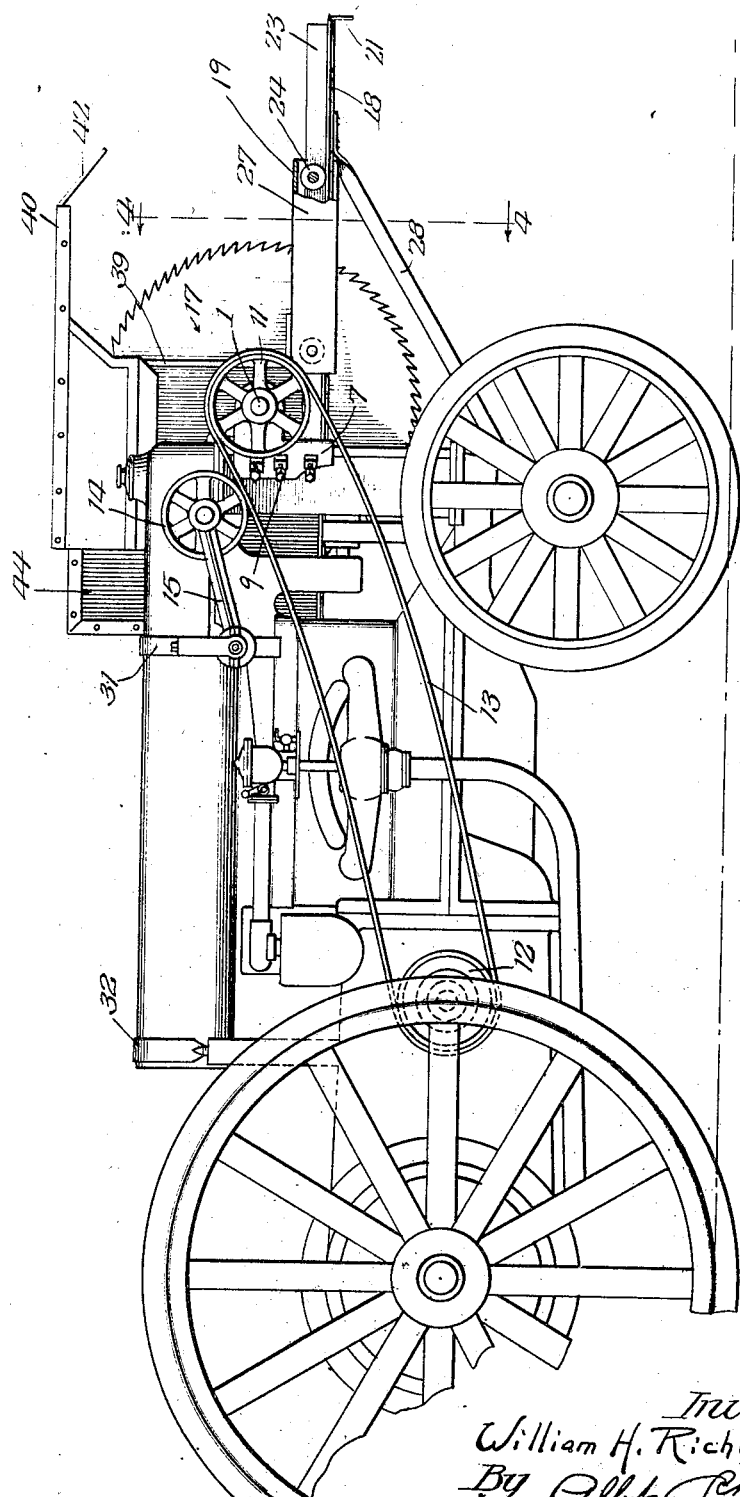

Patented June 24, 1924.

1,499,031

UNITED STATES PATENT OFFICE.

WILLIAM H. RICHEY, OF ARGYLE, IOWA.

SAW RIG FOR FORDSON TRACTORS.

Application filed May 31, 1922. Serial No. 564,832.

*To all whom it may concern:*

Be it known that I, WILLIAM H. RICHEY, citizen of the United States, residing at Argyle, in the county of Lee and State of Iowa, have invented certain new and useful Improvements in a Saw Rig for Fordson Tractors; and I do hereby declare the following to be a full, clear, and exact description of the invention, such as will enable others skilled in the art to which it appertains to make and use the same.

My invention relates to sawing appliances and in one of its general aspects aims to provide a saw rig which can readily be attached to, or detached from, a standard type of tractor, such as the well known "Fordson." In this aspect, my invention aims to provide a saw rig which can readily be secured to such a tractor without requiring machine work of any kind on the tractor, and which can readily be attached or detached as an entirety, thereby expediting its manipulation and avoiding both a puzzling on the part of inexperienced users and the possible loss or wrong assembling of parts of the saw rig.

More particularly, my invention aims to provide a saw rig having its main support in the form of a member which will extend across the front of the radiator of the tractor and which can readily be clamped to this radiator by merely tightening a few screws. It also aims to employ this main supporting member as a part of each of the bearings in which the spindle of the saw is journaled, aims to equip this supporting member with simple and strong means for supporting the table of the saw, and aims to provide the saw table with means for connecting the latter to other portions of the tractor so as to aid in holding the table and the entire saw rig rigidly supported.

In another aspect, my invention aims to provide a novel sawing appliance including a simple and cheaply constructed saw table equipped with simple means for stiffening the same and having the stiffening means also arranged for affording part of the needed supports for the saw table. Furthermore, my invention aims to provide a conveniently arranged feed table mounted on rollers traveling upon the saw table, and desirably aims to dispose the said stiffening means adjacent to the portions of the saw table which serve as tracks for the wheels supporting the feed table.

My invention also aims to equip the feed table with a suitable guard hood portion arranged to telescope over a companion guard or hood portion fastened to the feed table, so that the two hood portions will cooperate in affording a continuously operative guard which will be effective in all positions of the feed table and which will not interfere with the speedy and convenient operation of the saw. Various features of such a hood arrangement are more fully disclosed in my copending application No. 443161 as filed on February, 1921. In employing this arrangement, my present invention aims to provide a simple and inexpensive mounting for the movable portion of the guard, aims to provide this movable portion with a simple deflector for shielding the eyes of the user of the saw, and aims to utilize the support for the movable guard portion also as a part of the stop means for limiting the movement of the feed table towards the saw. Still further and also more detailed objects of my invention will appear from the following specification and from the accompanying drawings, in which—

Fig. 1 is a side elevation showing a saw rig embodying my invention as it appears when attached to a tractor, this being here shown as attached to a "Fordson" tractor, although I do not wish to be limited to the use of my saw rig in connection with any particular type or make of tractor.

Fig. 2 is an enlarged elevation of the same tractor and saw rig taken from the opposite side.

Fig. 3 is a perspective view of my saw rig, drawn on a larger scale than Figs. 1 and 2 and showing the rig when detached from the tractor.

Fig. 4 is a vertical section taken along the line 4—4 of Fig. 2 and showing portions of the main supporting member, the saw table, the feed table, and the saw, as well as the upper front portion of the radiator of the tractor.

Fig. 5 is an enlarged and fragmentary horizontal section taken along the line 5—5 of Fig. 4 to show the method of anchoring the supporting member to the front of the radiator.

In accomplishing the purposes of my invention after the manner of the accompanying drawings, I mount a saw spindle 1 in a pair of bearings each of which desirably has one half of the same formed as part of a beam 2 which is designed to extend across the front of the radiator 3 of the tractor at a sufficient distance above the bottom of the latter so as not to be in the way of the user when he cranks the machine. This beam 2 has suitable formations adapted to rest on some forwardly projecting portion of the radiator, for which purpose I desirably provide this beam with hooks 4 shaped for resting on the forwardly projecting flange 5 which forms the top of the frontal frame 6 of the radiator.

The transverse beam 2 is desirably in the form of a suitably shaped casting and has as an integral portion of this casting a pair of risers 7 and 8 which extend downwardly alongside the tractor at opposite sides of the radiator. These risers 7 and 8 are spaced from each other by a distance slightly wider than the extreme width of the frontal frame 6 of the radiator so that the supporting member of which the said risers and the beam 2 form a part can readily be slipped into a position in which the said risers extend alongside the opposite lateral edges of the frame 6, as shown in Fig. 4. In doing so, each of these risers extends rearwardly of the tractor beyond the adjacent portion of the frame 6, and each of these risers has threaded into it screws 9 adapted to engage the adjacent rear edge of the frame 6 after the manner of Fig. 5. Consequently, when the said supporting member is slipped into position as shown in Fig. 4 and the screws 9 are tightly screwed up after the manner of Fig. 5 and each latched by a corresponding lock nut 10, these screws will hold the supporting member from slipping off the ledge 5, while the hooks 4 which engage this ledge will sustain the weight of the supporting member, thereby clamping this member securely to the radiator. In practice, the frontal frames 6 on radiators commonly have their rear edges beveled, somewhat after the manner shown in Fig. 5, and the screws 9 desirably extend obliquely towards the axis of the radiator as also shown in the same figure, so that the angle at which the screws are set and the oblique rear edges of the frame 6 will cooperate in making the clamping action of the screws all the more effective.

At one side of the tractor, the spindle shaft 1 of the saw projects sufficiently to carry a pulley 11 in alinement with the power pulley 12 of the tractor, to which drive-pulley 12 the pulley 11 can then be connected by a belt 13. This belt is desirably kept taut by an idler 14 mounted on a swinging arm 15, although I do not wish to be limited to the use of such an idler arrangement.

At the other side of the tractor, the spindle 1 projects beyond the adjacent bearing 16 and has fastened to it a circular saw 17, which saw projects through slots in a saw table 18 and in a feed table which is movably mounted on this saw table. To support both of these tables, I desirably provide the riser 8 with a bracket 20 as shown in Fig. 4 and use this bracket as a direct support for one of the track strips 45 which support the base plate 18 of the saw table. This saw table plate 18 extends for a considerable distance alongside the tractor and desirably is reinforced along each edge by steel angle bars 22 and 23 fastened to the same. These angle bars desirably have their vertical webs disposed just outside the lateral edges of the saw table plate 18 and have their horizontal webs underhanging this plate after the manner shown in Fig. 4. Fastened to the under side of each of the horizontal angle webs is a strip 45 extending longitudinally of the saw table and projecting laterally beyond the angle iron to which it is fastened so as to form a track for the rollers 24 which form wheels at that side of the feed table 25 of the saw rig. Each of these rollers is pivoted on an axle 26 secured to a depending flange 27 of the feed table 25, the latter having two such flanges extending respectively at opposite sides thereof and laterally overhanging the angle bars 22 and 23. Each of the rollers has a flange overhanging the outer edge of the adjacent track strip to prevent the rollers from slipping off the track strips, while the depending flanges 27 on the feed table cooperate with the horizontal top 25 of this table in preventing the sawdust or chips from gathering on the angle bars 22 and 23 and thereby interfering with the free movement of the rollers 24.

In view of the strains which are imposed on the feed table when the saw is in operation, I desirably do not depend on the bracket 20 alone for supporting the saw table, but also connect the lower end of the riser 8 with a more forward portion of the saw table by a brace 28. Then I also desirably support the more rearward portions of the saw table by braces secured to adjacent portions of the tractor. For this purpose, I am here showing a pair of brackets 29 and 30 riveted respectively to the angle bars 23 and 22, each of these brackets having at its free end an ear so positioned that it can readily be interposed between the frame of the tractor and one of the straps 31 and 32 which hold the gasoline tank of the tractor in position. By loosening the fastenings for the straps 31 and 32 at that side of the machine, the brackets 29 and 30 can readily be secured to the tractor by these same fastenings, without requiring machine work or auxiliary fastening elements of any kind. As a further means of stiffening the saw table, I desirably also provide a brace 33 running from the upper end of the rear bracket 30 to the angle bar 23, as shown in Fig. 3, and form this brace both with a horizontal portion 46 extending alongside the angle bar 22 and with a transverse vertical web 47 having a perforation 48 through which a screw 49 also anchors this brace to the adjacent tank-support of the tractor.

To feed the stock to the saw, I desirably provide the feed table 25 at its forward end with an upwardly extending end 34 which in turn carries a forwardly extending horizontal platform 35, the latter terminating in a riser ledge 36 and I fasten a handle 50 to the end 34 by which the user can readily move the feed table. The slot 37 of the feed table desirably does not extend up to the riser end 34 of the latter, it being customary to interpose a stick of wood (such as that shown in dotted lines 38 in Fig. 3) between this riser and the stock which is to be sawed, and the forward movement of the feed table is limited by the ends of the front flange 21 on the saw table plate 18 as these ends project laterally beyond the track strips into the path of the feed table flange 27.

To guard against an excessive rearward movement of the feed table, I provide the latter with suitable stop means. For this purpose, I desirably employ at least one of a pair of risers 39 secured to the feed table in such a position that one of these risers will engage the top 16 of one of the spindle bearings to limit the sliding of the feed table towards the saw. Supported by the risers 39 is an upper hood portion 40 which has at its opposite sides a pair of depending side portions 41 and which has at its forward end a downwardly sloping deflector 42. The top 40 of this upper guard portion is disposed slightly above the top 43 of a stationary guard which has vertical sides 44 secured to some portion of the feed table arrangement, such as the angle bars 22 and 23. Thus arranged, the entire upper guard portion is carried by the feed table and moves back and forth with the latter, so that it telescopes over the upper portion of the stationary guard to a varying extent as the feed table is moved back and forth and therefore cooperates with the stationary guard portion in continuously housing a considerable portion of the saw. Moreover, the deflector 42 downwardly deflects sawdust or chips projected against it by the saw and hence protects the eyes of the user.

In operation, the said guard portions will therefore cooperate in affording a highly effective guard at all times, while the ledge formations 35 and 36 act both as an additional protection for the user of the saw and as means for temporarily supporting stock which is to be sawed. Moreover, it will be obvious from the drawings that by extending the feed table for a considerable distance alongside of the tractor and by providing the fastening brackets 29 and 33 as well as the forward brace 28, I secure the firm supporting of the saw table which is highly important, particularly if the sawing is to be done rapidly and on a green and tough wood. At the same time, my exceedingly simple arrangement for securing the entire saw rig to the tractor enables the user to attach or detach this rig very quickly. So also, the detached rig can readily be stored as an entirety without danger of losing any fastening elements or other small parts and without the necessity of taking it apart, so that my invention readily adapts itself to the needs of those who may want to use the saw rig at various times and on short notice.

However, while I have illustrated and described my invention as including various desirable features, I do not wish to be limited to the details of the construction and arrangement thus employed, it being obvious that the same might be modified in many ways without departing from the spirit of my invention or from the appended claims. Neither do I wish to be limited to the joint use of my saw rig attaching arrangement, my feed table construction arrangement, and my telescoping guard arrangement, as these various features might obviously be used independently of one another or in connection with substitutes for some of the same, although I have found the combination as here illustrated and described to be highly effective in actual practice. In using the combination as illustrated, it will be noted that the saw rig includes among its supporting parts one which practically forms a yoke for attachment to the front of the tractor, while other supporting parts are so positioned as to act as effective braces; that the entire rig in no way interferes with the cranking of the engine; that the saw table is rigidly supported at a convenient height to facilitate the sawing; that my saw rig includes guard and stop features which are highly desirable and which heretofore have not been employed on rigs of this general class; and that my entire saw rig (including the feed table and guard) can readily be attached or detached in its entirety without making any alterations whatever in the tractor and without using any tools other than an ordinary wrench. So also, the arrangement of the clamping screws on the main supporting member or yoke allows the user to make any adjustments needed for variations in the sizes of the parts, so that my saw rig will readily fit different tractors of the same make and type.

Moreover, by extending the saw table for a considerable distance alongside the tractor and fastening it at one or more points to the frame of the tractor, I overcome any tendency of the table to rock on the bracket 20 which supports it adjacent to the saw. Consequently, I do not require any supporting leg at the forward end of the table, and the rearward extension of the saw table affords a convenient shelf for storing and carrying supplies likely to be needed by the user of the saw rig.

I claim as my invention:—

1. A sawing attachment for a tractor whose radiator front projects laterally beyond the sides of the radiator, including a substantially yoke-shaped supporting frame having a portion seated upon the radiator top and having a portion engaged against a part of the radiator front and releasable means carried by the frame and engaging the rear edges of the laterally projecting radiator front portions to clamp the said frame portion against the radiator front.

2. A sawing attachment for a tractor which has its radiator front projecting laterally beyond the sides of the radiator, and also affording a substantially horizontal ledge, including a substantially yoke-shaped supporting frame engaged with the radiator front and having fingers resting upon the said ledge, and screws at each side of the frame engaging the rear edges of the laterally projecting radiator front portions.

3. A sawing attachment for a tractor which has a frontal frame projecting both forwardly and laterally beyond the radiator, the said attachment comprising a supporting frame having a portion thereof resting upon a forwardly projecting part of the said frontal frame, and having a pair of risers respectively disposed at opposite sides of the said frontal frame, and screws threaded through each of the risers and extending forwardly and inwardly into engagement with the rear edges of the adjacent laterally projecting frontal frame part.

4. A sawing attachment for a tractor of the Fordson type, including as the main supporting part of the saw rig a member extending horizontally across the front of the tractor adjacent to the radiator of the latter and presenting a pair of risers respectively at opposite sides of the tractor, the said member having a portion formed for resting upon a frontal portion of the radiator, means disposed respectively at opposite sides of the radiator for clamping the said member to the radiator to maintain the said portion in its said disposition, a table mounted on one of the risers, a shaft journaled in both risers and extending across the front of the tractor, and a tool carried by the shaft and disposed in cooperative relation to the table.

5. A sawing attachment for a tractor of the Fordson type, including as the main supporting part of the attachment a member extending horizontally across the front of the tractor adjacent to the radiator of the latter, the said member having a portion formed for resting upon a part of the radiator, means disposed respectively at opposite sides of the radiator for clamping the said member to the radiator to maintain the said portion in its said disposition, the said member also having a pair of risers respectively disposed at opposite sides of the tractor, one of the risers having a bracket intermediate its ends, a shaft journaled upon the member and extending parallel to the said member, a tool on the shaft, a table supported by the bracket, and a brace connecting an end of the last named riser with a portion of the table spaced from the bracket.

6. A sawing attachment for a tractor of the Fordson type, including as the main supporting part of the attachment a member extending horizontally across the front of the tractor adjacent to the radiator of the latter, the said member having a portion formed for resting upon a part of the radiator, means disposed respectively at opposite sides of the radiator for clamping the said member to the radiator, a table fastened to one of the risers and extending forwardly from that riser, a shaft journaled on the said member, a tool on the shaft in operative relation to the table, and a brace connecting the same riser with the forward end of the table.

7. A sawing attachment for a tractor having a radiator front projecting laterally and also affording a substantially horizontal ledge, the said attachment including a member extending horizontally across the front of the tractor and adjacent to the latter, the said member having a portion formed for resting upon the said ledge, releasable means disposed respectively at opposite sides of the radiator for clamping the said member to the radiator, a table fastened to the said member and disposed at one side of the tractor, a shaft journaled on the said member, a tool on the shaft in operative relation to the table, a stiffener fastened to the table, and rigid means for detachably connecting the rear end of the stiffener to the tractor rearward of the radiator front.

8. A sawing attachment for a tractor having a radiator front projecting laterally and also affording a substantially horizontal ledge, the said attachment including a member extending horizontally across the front of the tractor and adjacent to the latter, the said member having a portion formed for resting upon the said ledge, means upon the said member and disposed respectively at opposite sides of the radiator for drawing the said member rearwardly to clamp it to the radiator, a shaft journaled on the said member and also extending across the front of the radiator, a tool on the shaft, a table carried by the said member and disposed at one side of the tractor in operative relation to the tool, a stiffener fastened to the table, and rigid means for detachably connecting the rear end of the stiffener to the tractor rearward of the radiator front, the said means comprising at least one strap connected to the table and arranged for having the free end thereof interposed between a portion of the tractor frame and one of the straps which secure the gasoline tank of the tractor to the tractor frame.

9. A sawing attachment for a tractor having a radiator front provided with a horizontal ledge and with a laterally projecting frontal frame and having a gasoline tank secured at its rear to the chassis of the tractor by a strap; the said saw rig comprising a transverse member having a portion extending across the front of the radiator and partially resting upon the said ledge, a pair of risers disposed at opposite sides of the radiator front, means respectively carried by the risers and engaging the said frontal frame to hold the transverse member in engagement with the ledge, a table supported near its forward end by the said transverse member and extending alongside the radiator and the gasoline tank, and means associated with the said strap for supporting the rear end of the table.

10. A sawing attachment for a tractor having a radiator front provided with a horizontal ledge and with a laterally projecting frontal frame and having a gasoline tank secured at its rear to the chassis of the tractor by a strap; the said saw rig comprising a transverse member having a portion extending across the front of the radiator and partially resting upon the said ledge, a pair of risers disposed at opposite sides of the radiator front, means respectively carried by the risers and engaging the said frontal frame to hold the transverse member in engagement with the ledge, a table supported near its forward end by the said transverse member and extending alongside the radiator and the gasoline tank, and means associated with the said strap for supporting the rear end of the table, the said means comprising rigid members secured respectively to opposite sides of the rear end of the table.

11. An attachment for tractors of the type having a radiator front which has forwardly projecting horizontal and vertical side portions, including a member engaged against the radiator front and having means engaging the horizontal portion to support the member against downward movement, and means carried by the member for engaging the side portions of the radiator front and operable for clamping the member to and against the radiator front.

Signed at Argyle, Iowa, May 25, 1922.

WILLIAM H. RICHEY.